Nov. 15, 1960     C. PASQUALE     2,959,955
PRESS FOR TESTING PRESSURE-TIGHTNESS
OF PIPE AND TUBES
Filed Nov. 12, 1957

2,959,955

PRESS FOR TESTING PRESSURE-TIGHTNESS OF PIPES AND TUBES

Camillo Pasquale, Turin, Italy, assignor to R.C.M. Revisione Costruzione Macchine, Turin, Italy Filed Nov. 12, 1957, Ser. No. 695,866

Claims priority, application Italy Apr. 16, 1957

2 Claims. (Cl. 73—49.1)

This invention relates to a press for testing pressure-tightness of pipes, the press being provided with quick-acting means for clamping the pipe in its testing position and subsequently releasing it.

The improved press chiefly comprises two axially displaceable carriages cooperating with the ends of the pipe resting on a middle support. The carriages are each provided with a front flange for axially clamping the pipe and an annular seal adapted to fit around the pipe for pressure sealing thereof. The flanges clamp the pipe under the action of resilient means before the seals come into contact with the pipe ends.

Further features and advantages of this invention will be understood from the appended detailed description reference being made to the accompanying drawings which show diagrammatically by way of example an embodiment thereof.

Figure 1:
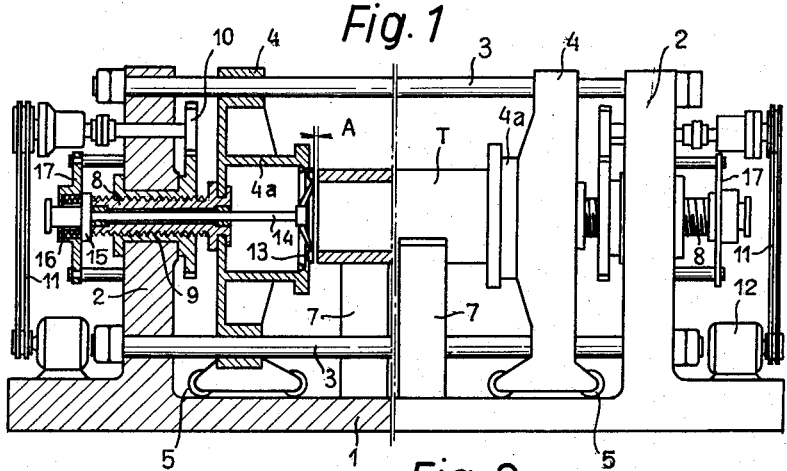
Figure 1 is a partially sectional elevational view of the press.
Figure 2:
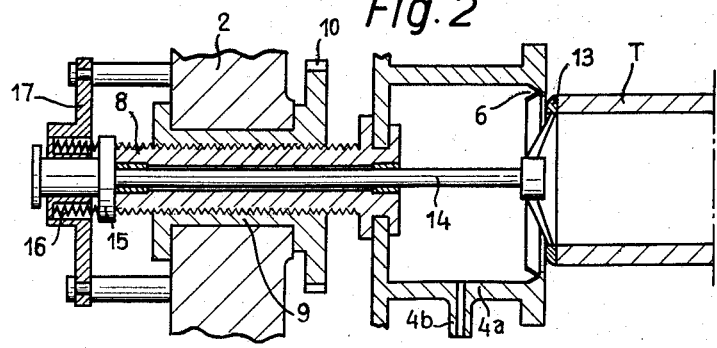
Figures 2 and 3 are enlarged sectional views of a portion of Fig. 1 and respectively show one of the axially displaceable carriages in each of two operating positions.
Figure 3:
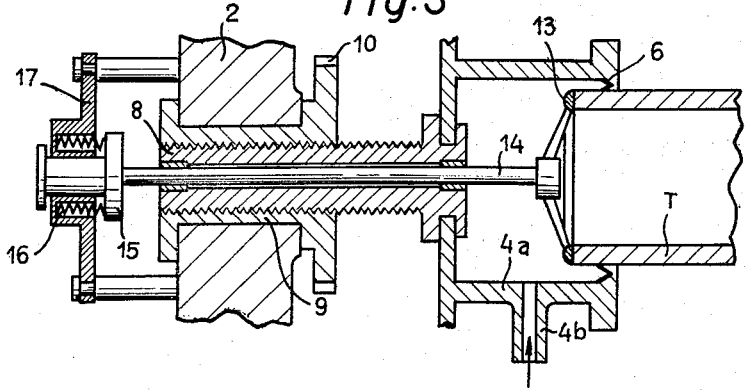

A bedplate 1 is provided at its ends with upwardly extending stationary pillars 2 which are interconnected by longitudinal bars 3, the bars being adapted to support stresses generated by pressure on test of the pipe.

The pipe T being tested is supported by two intermediate supports 7 which are located between two axially movable carriages 4 that are provided with guide rollers 5. Each of the carriages comprises a bell-shaped header 4a which is arranged coaxially with the pipe T.

The bell-shaped headers 4a of both movable carriages carry at their respective edges, facing the pipe ends, an annular seal 6 on the forward movement of the carriage, each of the seals is adapted to fit about the adjacent end of the pipe to seal the pipe and header against pressure.

The movable carriages are each fast with an axial hollow stem 8 comprising an external screw thread and acting as a screw engaged within nuts 9 which are mounted for rotation in the stationary pillars 2. The nuts are rotated through a gear 10 which is driven by a belt drive 11 from driving motors 12. The driving motors are capable of rotation in both directions, whereby the carriages may be displaced towards and away the adjacent end of the pipe.

The screws 8 and associated bell-shaped headers 4a have cylindrical rods 14 extending axially therethrough and slidable therein. The rods carry at their end facing the pipe a flange 13 matching the pipe in diameter, the flange being conveniently apertured to admit flow of pressure fluid from the bell-shaped headers to the inside of the pipe. Each of the rods has a flange 15 at the opposite end from flange 13. Flange 15 is axially acted upon on its outer face by springs 16 which are located in a stationary support 17. The other face of the flange 15 bears in its inoperative condition, against the end of the screw 8 to maintain the flange 13 spaced by a distance "A" from the end of the pipe T.

The pipe is locked in its position for test as follows:

The pipe is placed on the intermediate supports 7 and the two motors 12 are simultaneously started to move the movable carriages 4 towards the pipe ends. As soon as the screw 8 starts its axial movement on rotation of the nut 9, the flanges 15 fast with the rods 14 move towards the pipe under the action of their associated springs 16, whereby the flanges 13 axially clamp the pipe ends. The clamping force can be easily adjusted by suitably varying the load on springs 16.

As the movable carriages move further, the seals 6, carried by the bell-shaped headers 4a gradually fit over the ends of the pipe T sealing the pipe ends in the headers.

Each header 4a has associated therewith a pressure fluid source (not shown) connected thereto through a fitting 4b in a lowermost part of the header. A pressure fluid, such as water, may be then delivered to the headers and pipe T and its pressure increased up to a value selected for the test.

Upon completion of the pressure test on the pipe, the latter is released by energising the motors 12 to rotate in a direction opposite the former direction of rotation. The annular seals 6 are thereby first removed from the pipe ends and the flanges 13 are released as soon as the outer end of the screws 8 bears on the flanges 15 of the rods 14.

The pipe is not axially displaced by the friction of the seals on the pipe's outer surface, the pipe being securely held by the flanges 13 until the seals are fully removed from the pipe.

On introduction and removal of the annular seals 6 from the pipe ends, the seals slide over the outer profile of the flanges 13 which are suitably rounded and polished, the seals not contacting the sharp edges of the pipe ends which might damage the seals.

It will be understood that the principle of the invention being left unaltered, constructional details and embodiments can be varied from the example described and illustrated without departing from the scope of this invention.

What I claim is:

1. In an apparatus for testing pressure tightness of a pipe, an elongated bedplate capable of longitudinally accommodating a pipe, a pair of pillars at opposite ends of the bedplate, a carriage associated with each pillar and displaceable on the bed lengthwise thereof towards and away from the associated pillar, a bell-shaped header fixedly supported from each carriage, each said header having its open end directed towards the opposite pillar whereby the respective headers can engage the respective facing ends of the pipe in selected positions of the carriages on the bedplate, an annular sealing member in each header providing fluid-tight seals between the headers and the engaged pipe ends, means for delivering pressure fluid into the respective headers, a hollow stem fastened to each carriage and extending lengthwise of the bedplate through the respective associated pillars coaxially of the headers, means associated with each stem and its supporting pillar for displacing the respective carriages lengthwise of the bedplate, a rod axially slidable in each stem, each said rod having opposite end portions protruding respectively beyond the free ends of the stems and into the respective headers, a pair of flanges at opposite ends of each rod, and spring means urging one said flange of each rod into abutment with the free end of the associated stem; the other said flange of each rod protruding beyond the open end of the associated bell-shaped header when the respective carriages are retracted towards their respective associated pillars, 2. In an apparatus as claimed in claim 1, the said means associated with each stem and supporting pillar comprise an external screw thread on the stem, a nut-member screwed on the stem, the said nut-member being rotatable in the pillar but prevented from being axially displaced with respect to said pillar, and a gear rotatably mounted to engage the nut-member, whereby the stem and carriage are supported and axially displaced on rotation of the gear and nut-member.

References Cited in the file of this patent

UNITED STATES PATENTS

| | | |
|---|---|---|
| 2,617,291 | Grau | Nov. 11, 1952 |
| 2,755,661 | Lorant et al. | July 24, 1956 |
| 2,873,764 | Lombard | Feb. 17, 1959 |

FOREIGN PATENTS

| | | |
|---|---|---|
| 722,040 | Great Britain | Jan. 19, 1955 |